Patented Nov. 14, 1950

2,529,769

UNITED STATES PATENT OFFICE 2,529,769

CASTER WITH ANGULAR VIBRATION DAMPER

George Hallewell, Stamford, England, assignor to Blackstone and Company Limited, Stamford, England Application November 12, 1947, Serial No. 785,393
In Great Britain May 20, 1947

3 Claims. (Cl. 16—35)

1

This invention relates to caster wheel assemblies, and more particularly to those especially adapted for use in agricultural field machines.

It is usual to employ a caster wheel in many types of agricultural field machinery, and on account of the varying state of the ground over which this wheel must pass, there is a liability to angular vibration of the caster wheel and its spindle relative to the machine.

The idea underlying the present invention is to apply friction damping to such caster wheels in a manner appropriate to agricultural field machines, so as to minimise or avoid the likelihood of angular vibration.

In its simplest form self-adjusting frictional damper members, respectively stationary and mounted on the spindle, are employed: the loading between the friction surfaces of the damper preferably includes transmitting the load of the machine on to the caster wheel, and preferably spring loading in addition. Other parts of the invention lie in the placing of the frictional damper above the point where grease or oil is liable to creep, and forming a part or parts above the friction surfaces to protect them from water.

Further parts of the invention are embodied in a typical form which will now be described by way of example, with reference to the accompanying drawings in which.

Figure 1:
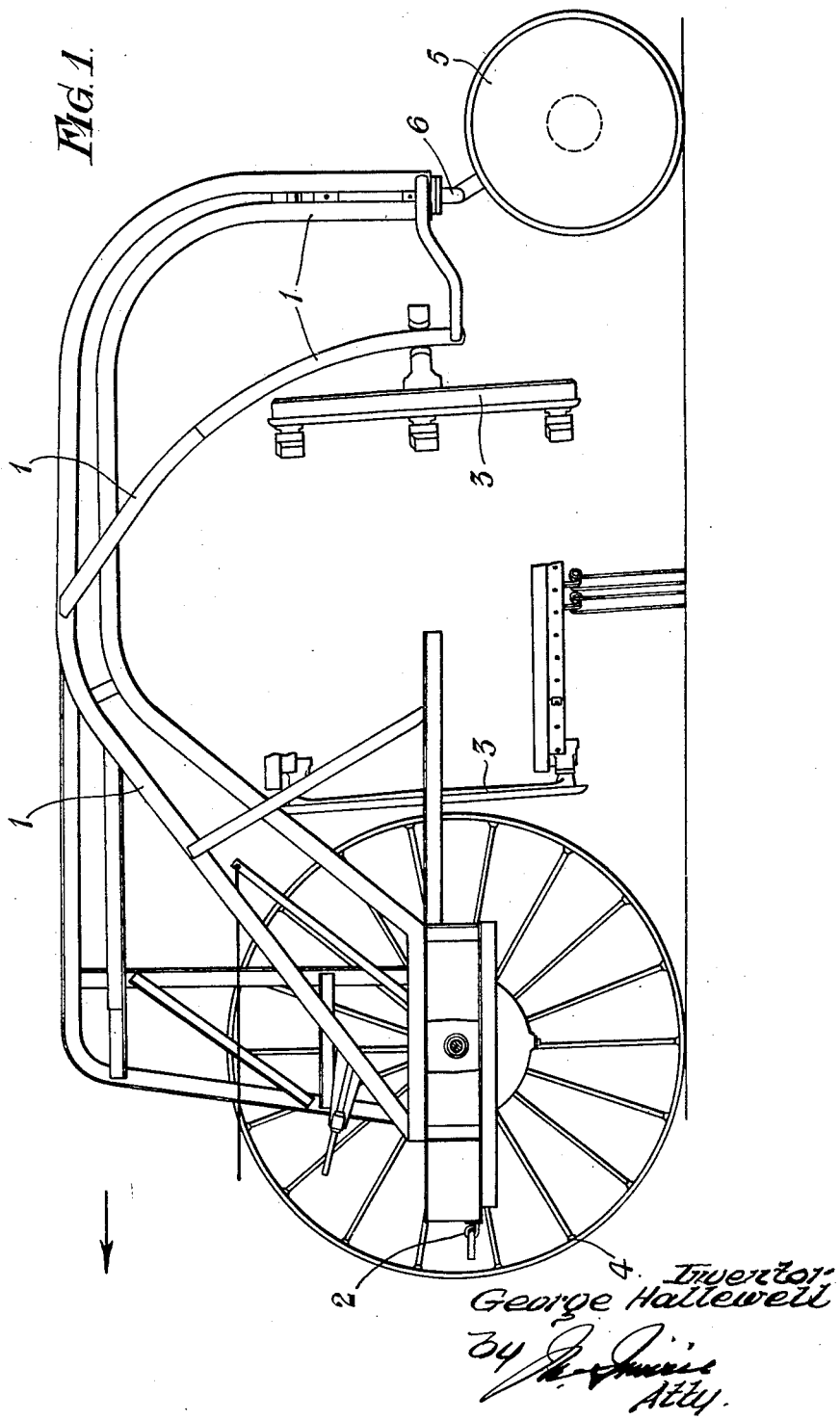
Fig. 1 shows diagrammatically an agricultural field machine of the type having front wheels and a rear caster wheel fitted with friction damping means.
Figure 2:
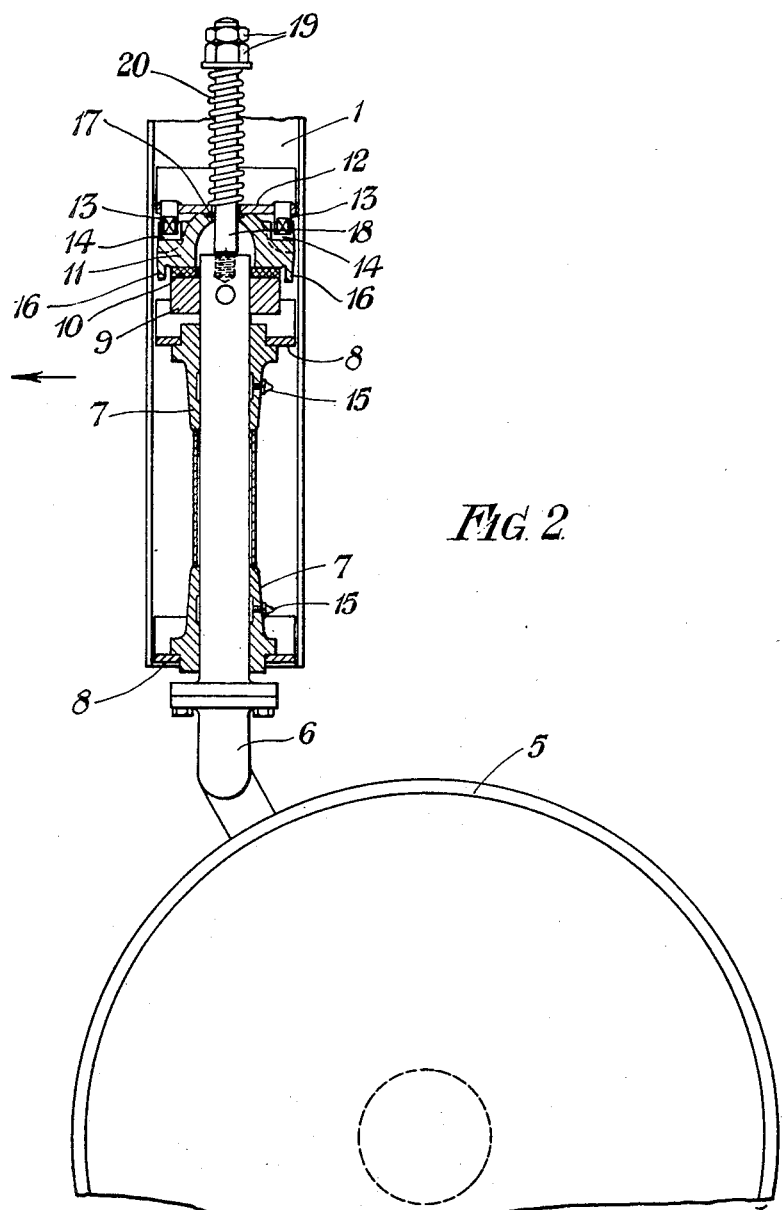
Fig. 2 is a sectional view to a larger scale, showing the mounting of the caster wheel.

The machine shown by way of example is a side rake, though the invention is not confined to any particular tool but is applicable to agricultural field machines generally wherever it is required to damp the angular vibration of a caster wheel. The frame 1 is arranged to be towed by a tractor from coupling 2 and carries the rake 3 driven from the axle of a pair of front wheels 4. The rear weight is taken by a caster wheel 5.

The caster wheel 5 is carried by a pivot spindle 6 mounted in bearings 7, 7 and carried in housings 8, 8 rigidly secured to a portion of the rear of the machine frame 1.

A collar 9 is rigidly pinned to the spindle near its upper end, and its upper face engages with a disc 10 of suitable friction material, which in turn engages with the lower face of an upper casting 11 which is substantially fixed relative to the machine frame 1 so that these three parts form a damper to swiveling action of the caster wheel 5.

2

This casting is located in relation to the machine frame by butting against a bracket 12 which is rigidly attached to the machine, and the casting 11 has enough clearance to permit a small degree of universal angular movement in relation to the axis of the caster wheel spindle, so that the friction disc 10 engages over its whole face both with the collar 9 and the casting 11 and the friction members are consequently self-adjusting as to their alignment. The casting 11 is prevented from moving angularly about the spindle axis by two pins 13, 13 which project downwards from a plate or the like of the bracket 12 and are rigidly attached to it. The lower ends of the pins 13 engage in slots 14, 14 formed in the upper face of the casting, sufficient clearance being allowed to permit the slight angular adjusting movement previously mentioned.

The collar 9 is placed well above both bearings as, by so doing, grease or oil is prevented from reaching the working faces of the friction disc when the bearings are lubricated at points 15, 15.

It is also important that the friction disc 10 be kept dry and the casting 11 is provided with an enclosing flange 16 and with a rubber or other suitable seal 17 where a stud 18 passes through its top face. By this means the casting 11 forms an umbrella over the friction faces.

The necessary axial loading imposed on the friction disc to provide resistance to angular movement, is provided by the portion of the weight of the machine carried by the caster wheel. An additional feature of the arrangement is that this loading may be supplemented by adjustable spring loading, and for this purpose the stud 18 is rigidly attached to the top of the spindle 6 and provided with locking nuts 19 which enable the pressure of a helical spring 20 to be adjusted to meet the conditions.

I claim:

1. A caster assembly comprising a load frame, a spindle journalled in said load frame, a caster wheel journalled on said spindle at right angles to the axis of said spindle, load transmitting elements respectively attached to said spindle and to said frame and disposed substantially in axial alignment with said spindle and with the frame attached element frictionally bearing on and supported by said spindle attached element, and means adjustably connecting at least one of said elements to its attachment for permitting a deviation relative to the spindle axis to maintain full bearing engagement between said elements.

2. A caster assembly comprising a load frame, a spindle journalled in said load frame, a caster wheel journalled on said spindle at right angles to the axis of said spindle, load transmitting elements respectively attached to said spindle and to said frame and disposed substantially in axial alignment with said spindle, said elements having flat abutting faces with the face of the frame attached element frictionally bearing on and supported by the face of said spindle attached element, means rigidly connecting one of said elements to its attachment, and means adjustably connecting the other of said elements to its attachment for permitting an angular deviation relative to the spindle axis to maintain full bearing engagement between the faces of said elements.

3. A caster assembly comprising a load frame, a spindle journalled in said load frame, a caster wheel journalled on said spindle at right angles to the axis of said spindle, a collar rigidly fixed on said spindle, a load transmitting element freely surrounding said spindle and having a flat bottom face frictionally bearing on and supported by said collar, a bracket rigidly connected to said frame and bearing centrally on said element, and means loosely and non-rotatively connecting said bracket and said element for permitting an angular deviation therebetween.

GEORGE HALLEWELL.

REFERENCES CITED

The following references are of record in the file of this patent:

UNITED STATES PATENTS

| Number | Name | Date |
| --- | --- | --- |
| 1,968,046 | Linn | July 31, 1934 |
| 2,175,088 | Oppenheim et al. | Oct. 3, 1938 |
| 2,181,722 | Butter et al. | Nov. 28, 1939 |
| 2,213,967 | Roche | Sept. 10, 1940 |
| 2,263,240 | Hise | Nov. 18, 1941 |